Sept. 1, 1959     D. J. LA BELLE     2,902,240
MOUNTING MEANS
Filed July 11, 1955     2 Sheets-Sheet 1
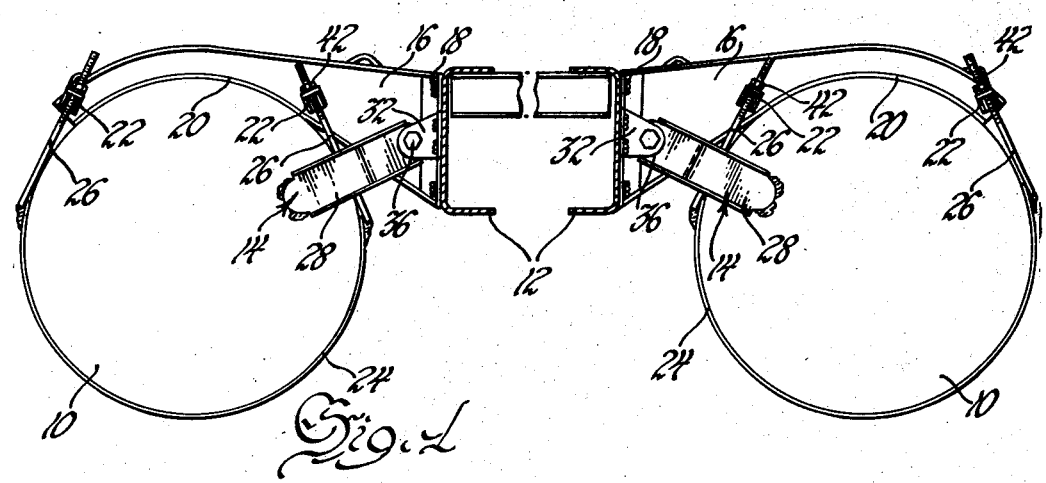
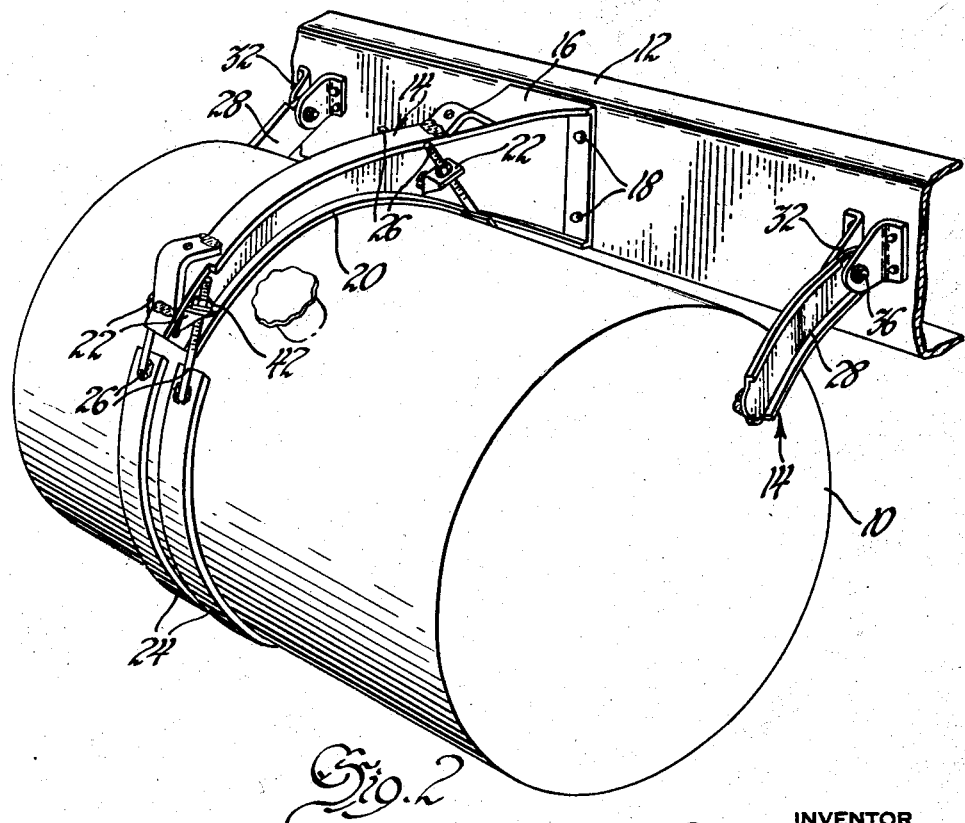
INVENTOR
Donald J. La Belle
BY
L. D. Burch
ATTORNEY Sept. 1, 1959   D. J. LA BELLE   2,902,240
MOUNTING MEANS
Filed July 11, 1955   2 Sheets-Sheet 2
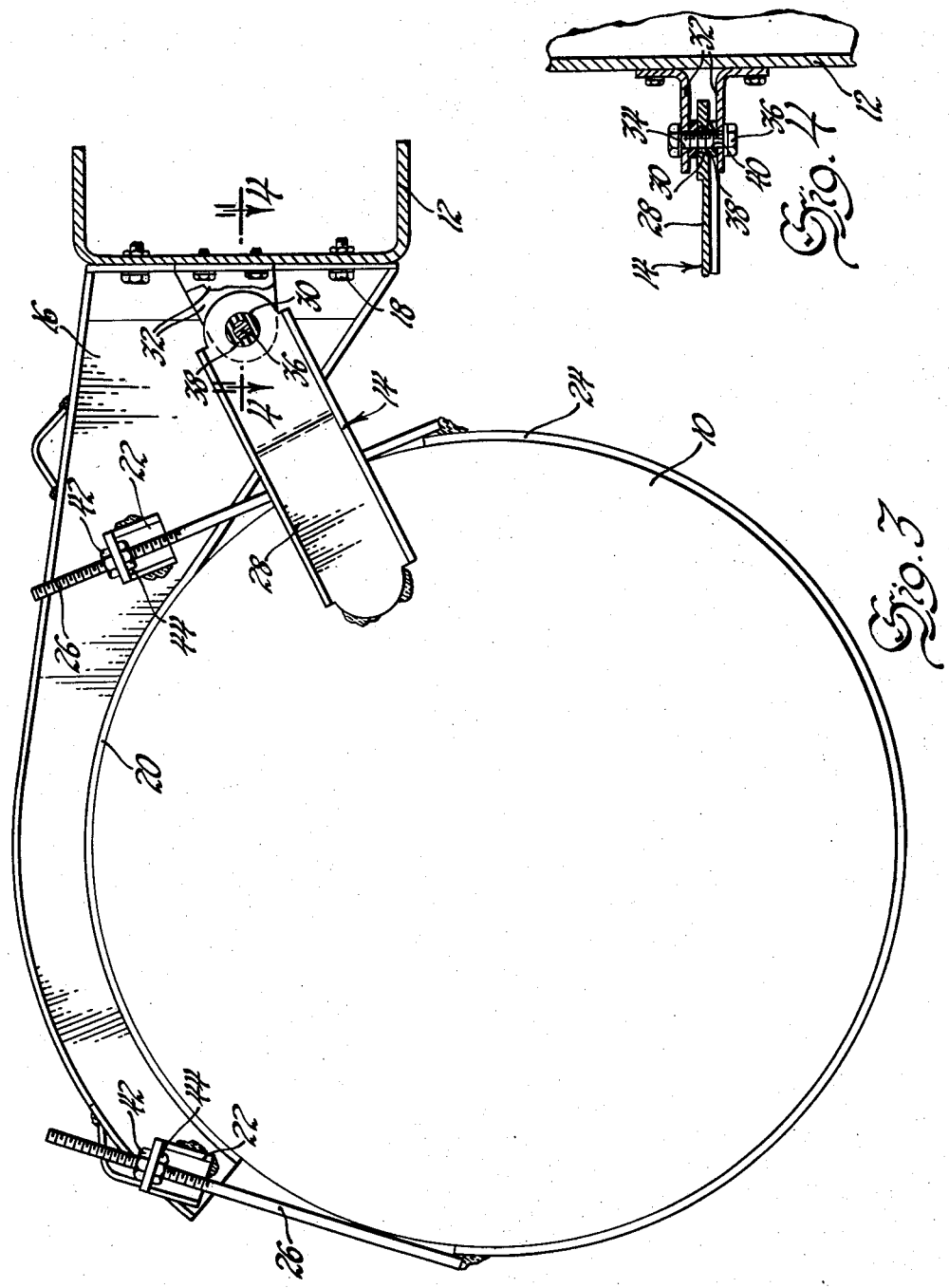
INVENTOR
Donald J. La Belle
BY
L. D. Burch
ATTORNEY

United States Patent Office 2,902,240
Patented Sept. 1, 1959

2,902,240

MOUNTING MEANS

Donald J. La Belle, Huntington Woods, Mich., assignor to General Motors Corporation, Detroit, Mich., a corporation of Delaware Application July 11, 1955, Serial No. 521,052

5 Claims. (Cl. 248—201)

This invention relates to means for mounting objects to a support, and more particularly to means for mounting an elongated fuel tank or other member on a frame or other member of a vehicle in a manner so that stresses in the frame member are not transmitted to the tank.

It has become the practice in the case of certain vehicles to mount cylindrical or other fuel tanks to the side frame members thereof. In such cases it is customary to provide spaced brackets or other means by which the ends of each tank may be rigidly secured to the frame member.

While this would appear to provide a very strong and safe means for securing such tanks, it has been found that there are certain serious objections thereto.

The tanks are normally constructed of steel so that the weight of the tank plus the weight of the fuel comprises a substantial mass which is subject to severe vibrations when the vehicle is operated. In addition to this, stresses in the vehicle frame members between the spaced points of rigid attachment of the tank are transmitted directly to the tanks. In other words, vibrations in the tanks are transmitted to the frame, and vibrations in the frame are transmitted to the tanks. This often results in rupture of the means securing the tanks to the frame, and possibly in damage to the tanks and the frame members themselves. Also, the heavy vibrating tank and fuel mass undoubtedly results in vibration of the entire vehicle so that various other parts of the vehicle may be damaged or worn out sooner than necessary, thus creating a driving hazard.

It is now proposed to substantially eliminate the above mentioned objections to present means of mounting vehicle fuel tanks. This is accomplished by securing the tank rigidly to the frame essentially at a single position intermediate the ends of the tank. Since the tank is thus rigidly mounted to the frame at only one point, stresses in the frame cannot be transmitted to the tank and rotational vibrations of the tank cannot be transmitted to the frame. Resilient means for securing the ends of the tank are also provided to prevent the uncontrolled rotation of the tank about the single point of attachment thereof to the frame.

In the drawings:

Figure 1 is an end elevational view of a pair of fuel tanks as they would be mounted on opposite sides of a vehicle by means embodying the invention.

Figure 2 is an enlarged perspective view of one of the tanks shown by Figure 1 illustrating more clearly the proposed method of mounting the tank.

Figure 3 is a still further enlarged end elevational view of the left-hand tank shown by Figure 1, with portions thereof broken away to illustrate in greater detail the resilient mounting of the ends of the tank to the frame.

Figure 4 is cross-sectional view taken in the plane of line 4—4 of Figure 3 and looking in the direction of the arrows.

Referring to the drawings in greater detail, one or more fuel or other tanks 10 may be secured to each of the vehicle side frame members 12 by mounting means 14 adapted to prevent the transmission of stresses in the frame to the tanks and vibrations in the tanks to the frame.

Each mounting means 14 includes a single cantilever beam type bracket 16 of any desired construction and secured by bolts 18 or any other suitable means to the frame member 12. The underside 20 of the bracket 16 is preferably formed to correspond to the shape of the top surface of the tank 10 to be supported by the bracket. In the drawings, for instance, the tanks 10 are shown to be cylindrical so that the underside of the brackets are provided with circular concave surfaces 20 to engage the outer surfaces of the tanks.

The bracket 16 is provided with oppositely disposed bosses 22 or other devices at each end of the concave surface 20, the bosses being provided with apertures to receive a fastening element such as a threaded stud.

A pair of hanger straps 24 having studs 26 secured to the opposite ends thereof are secured to the bracket 16, with each strap 24 being secured between the bosses 22 on the same side of the bracket 16.

Each tank 10 has secured at each end thereof a bracket 28 having an aperture 30 at the free end thereof. Each frame member 12 has secured thereto pairs of closely spaced brackets 32, with each pair of brackets 32 being equally spaced on opposite sides of the bracket 16 and being spaced from each other about the same distance as the distance between the brackets 28 at the ends of the tank 10. The free ends of the brackets 32 are provided with aligned apertures 34 adapted to receive the bolt 36. The aperture 30 at the free end of each of the brackets 28 at the ends of the tank 10 is fitted with a grommet 38 made of rubber or other resilient material, the grommet 38 being approximately as long as the distance between the individual brackets in each pair of brackets 32 on the frame 12.

The tank 10 may be assembled to the frame 12 by inserting the free ends of the end brackets 28 on the tank between the pairs of brackets 32 on the frame 12 and passing the bolt 36 or other stud fastener through the aligned apertures 34 in the pair of brackets 32 and the aperture 40 in the grommet 38. A nut may be tightened on the bolt 36 sufficiently to prestress the grommet 38 if so desired to any extent. The tank 10 may then be rotated upwardly till the top surface thereof engages the underside 20 of the cantilever bracket 16, and the hanger straps 24 may be placed under the tank 10 and secured to the bosses 22 by means of nuts 42 which may be tightened to any extent desired to rigidly secure the tank to the cantilever bracket 16. Lock nuts 44 may be employed to lock the straps 24 at the desired degree of tension.

With the proposed tank mounting structure, it is apparent that the undesirable transmission of stresses along a portion of the frame member to the tank and from the tank to the frame member, as would be the case where each end of the tank were rigidly secured to the frame member, is substantially if not completely eliminated. This is due to the fact that the tank is rigidly secured to the frame by means not spaced along the frame but located for all practical purposes at a single transverse plane along the frame. While two straps are shown in the preferred form of the invention as a safety measure in case one should fail, it is apparent that only one such strap need actually be provided. The resilient mountings for the ends of the tank not only prevent the transmission of stresses from the frame to the tank, but they also stabilize the entire structure by preventing uncontrolled rotational vibrations of the tank about the intermediate rigid mounting provided by the cantilever bracket.

Although there has been illustrated and described only a single preferred embodiment of the invention, it is not intended that the invention be limited thereby, it being contemplated that many variations in structure may be made without departing from the scope thereof. It is apparent, also, that the proposed mounting means not limited to use with fuel tanks on vehicles but is adapted to mount any object to a support.

What is claimed is:

1. In a motor vehicle, a frame member, a bracket secured to said frame member at one end only and extending laterally therefrom, fastener means at each end of said bracket on opposite sides thereof, a supported member positioned under said bracket, the underside of said bracket engaging said supported member midway between the ends thereof, means cooperating with said fastener means on said bracket and rigidly securing said supported member to said bracket and to said frame member, the ends of said supported member being swingingly connected to said frame member by resilient means.

2. In a motor vehicle having a frame, a single cantilever bracket secured to said frame, fastener means at each end of said bracket on opposite sides thereof, a supported member positioned under said bracket so that the underside of said bracket engages said supported member intermediate the ends thereof, means cooperating with said fastener means on said bracket for rigidly securing said supported member to said bracket and to said frame, the ends of said supported member being pivotally secured to said frame by resilient means.

3. In a vehicle having a fuel tank and a frame, means rigidly securing said tank to said frame at a point intermediate the ends of said tank, said means preventing the transmission of stresses from said frame to said tank; and spaced resilient means connecting the ends of said tank to said frame, said spaced means preventing the rotation of said tank about said first rigid means.

4. Means for isolating stresses in a frame from a member rigidly supported on said frame, said means including a one point cantilever suspension arm rigidly secured to said frame for supporting said member at a central point and a pair of brackets rigidly secured to said member and resiliently connected to said frame, said arm being intermediate said brackets.

5. In combination, a frame, a support member extending laterally from said frame and rigidly secured thereto, a supported member, means for removably securing said supported member to said support member in a plane transverse to said supported member and said frame, said means including two parallel straps independently and adjustably secured to said support member whereby said supported member may be rigidly secured to said support member, and bracket means rigidly secured to said supported member and resiliently connected to said frame whereby said supported member is rigidly secured to said frame only in said transverse plane and is resiliently prevented from substantial relative movement with respect to said frame.

References Cited in the file of this patent

UNITED STATES PATENTS

| | | |
|---|---|---|
| 2,225,417 | Kleinfeldt | Dec. 17, 1940 |
| 2,376,336 | Brown | May 22, 1945 |
| 2,575,858 | Bennett | Nov. 20, 1951 |
| 2,622,887 | Prior | Dec. 23, 1952 |